US012602214B2

(12) United States Patent
Vijayaraghavan et al.

(10) Patent No.: US 12,602,214 B2
(45) Date of Patent: Apr. 14, 2026

(54) DYNAMIC EVALUATION AND IMPROVEMENT OF ENERGY EFFICIENCY OF COMPUTER CODE

(71) Applicant: Accenture Global Solutions Limited, Dublin (IE)

(72) Inventors: Koushik M. Vijayaraghavan, Chennai (IN); Jeffson Felix Dsouza, Bangalore (IN); Pradeep Kumar Senapati, Bangalore (IN); Ilangovan Sivakumar, Chennai (IN); Dibyendu Chattopadhyay, North Twenty Four Pargana (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 253 days.

(21) Appl. No.: 18/470,855

(22) Filed: Sep. 20, 2023

(65) Prior Publication Data
US 2025/0094146 A1 Mar. 20, 2025

(51) Int. Cl.
| | |
|---|---|
| *G06F 8/41* | (2018.01) |
| *G06F 8/75* | (2018.01) |
| *G06F 8/77* | (2018.01) |
| *G06F 11/3604* | (2025.01) |
| *G06N 3/044* | (2023.01) |
| *G06N 3/045* | (2023.01) |

(52) U.S. Cl.
CPC .............. *G06F 8/4432* (2013.01); *G06F 8/75* (2013.01); *G06F 8/77* (2013.01); *G06F 11/3604* (2013.01); *G06N 3/044* (2023.01); *G06N 3/045* (2023.01)

(58) Field of Classification Search
CPC . G06F 8/4432; G06F 8/75; G06F 8/77; G06F 11/3604; G06F 11/3668; G06N 3/045
See application file for complete search history.

(56) References Cited

U.S. PATENT DOCUMENTS

| | | | |
|---|---|---|---|
| 2021/0208855 A1 | 7/2021 | Zhang et al. | |
| 2021/0357307 A1 | 11/2021 | Deng et al. | |
| 2024/0319993 A1* | 9/2024 | Penrose | ................... G06F 8/72 |

FOREIGN PATENT DOCUMENTS

| | | | | |
|---|---|---|---|---|
| CN | 115952076 A | 4/2023 | | |
| EP | 4513327 A1* | 2/2025 | ............ | G06F 11/302 |
| WO | WO-2021119601 A1* | 6/2021 | ............ | G06N 3/084 |

OTHER PUBLICATIONS

Bourdon et al., "PowerAPI: A Software Library to Monitor the Energy Consumed at the Process-Level," ERCIM News, Jan. 2013, 92:43-44.

(Continued)

*Primary Examiner* — Geoffrey R St Leger
(74) *Attorney, Agent, or Firm* — Mannava & Kang, P.C

(57) ABSTRACT

Methods, computer systems, and apparatus, including computer programs encoded on computer storage media, for evaluating an energy efficiency of a computer code snippet. A computer-implemented system obtains code data characterizing a computer code snippet and rule data characterizing one or more energy efficiency rules, and processes the code data and rule data using machine-learning models to detect energy efficiency defects in the computer code snippet that negatively impact a dynamic energy efficiency of the computer code snippet upon execution by the computing device.

18 Claims, 4 Drawing Sheets

(56) References Cited

OTHER PUBLICATIONS

Brown et al., "Language Models are Few-Shot Learners," CoRR, submitted on Jul. 20, 2020, arXiv:2005.14165v4, 75 pages.

Businesswire.com [online], "CAST Launches 'Green IT Index' to Measure Inefficient Software," Aug. 4, 2014, retrieved on Jan. 23, 2024, retrieved from URL<https://www.businesswire.com/news/home/20140804005132/en/CAST-Launches-%E2%80%98Green-IT-Index%E2%80%99-to-Measure-Inefficient-Software>, 2 pages.

Truong Giang Nguyen et al. "Multi-Granularity Detector For Vulnerability Fixes", IEEE Transactions On Software Engineering, vol. 49, No. 8, Aug. 1, 2023, pp. 4035-4057.

Yan Xiao et al. "Improving bug localization with word embedding and enhanced convolutional neural networks", Information and Software Technology, Elsevier, Amsterdam,NL, vol. 105, Aug. 15, 2018, pp. 17-29.

* cited by examiner

300

Obtain code data
310

Obtain rule data
320

Generate embedding feature vectors for code data and
rule data
330

Process the embedding feature vectors to generate
detection output characterizing energy deficiencies
340

Perform an action based on the detection output
350

DYNAMIC EVALUATION AND IMPROVEMENT OF ENERGY EFFICIENCY OF COMPUTER CODE

TECHNICAL FIELD

This specification generally relates to evaluating and improving the energy efficiency of computer code, which includes evaluating and improving a dynamic energy efficiency of one or more snippets of computer code upon execution by a computing system.

BACKGROUND

Software usage in information and communication technology (ICT) has increased significantly in the last decade to meet the growing digital needs of the population. As a result, the ICT sector has become a major consumer of energy, and its energy consumption is growing rapidly. Improving energy efficiency of computer code can help to reduce the environmental impact of ICT.

SUMMARY

This specification describes computer-implemented systems and methods for evaluating and optimizing the energy efficiency of computer code. In particular, the described techniques can be used to detect defects in the computer code, which include one or more portion(s) or snippet(s) of a computer code that negatively impact the dynamic energy efficiency of the computer code portion(s)/snippet(s) upon execution by a computing device, and recommend updates to the portion(s)/snippet(s) for improving the dynamic energy efficiency.

In this specification, a defect in a computer code refers to a portion or snippet of computer code that negatively impacts the code performance, such as reducing the energy efficiency of the computer code snippet upon execution by a computing device. In this specification, the dynamic energy efficiency of a code snippet refers to the efficiency in energy consumption of the code snippet during dynamic interactions of the code snippet being executed by a computing system. Examples of dynamic interactions can include inter-module interactions, intra-module interactions, and/or interactions with RAM, cache memory, and/or databases of the computing system that executes the code snippet. The dynamic energy efficiency of a code snippet differs from the static energy efficiency. Conventional code efficiency analysis techniques may perform static energy efficiency analysis at higher levels of computer code, but such techniques fail to account for the dynamic interactions that can occur during code execution and in this regard, fail to evaluate, and generate recommendations and corrective actions with respect to energy efficiency of code during dynamic interactions. On the other hand, the methods and systems described in this specification use machine-learning techniques to perform a comprehensive analysis of input code snippets in the context of a combination of factors, including, e.g., code commits, energy efficiency rules, log key messages, and example code fixes from a code repository. The machine-learning techniques combined with data collection and correlation from different systems enable identifying and locating code defects impacting the dynamic energy efficiency.

In one particular aspect, the specification describes a method for evaluating energy efficiency of a computer code snippet. The method can be performed by an allocation system including one or more computers. The system obtains code data characterizing a computer code snippet to be executed by a computing device, obtains rule data characterizing one or more energy efficiency rules, and generates a first input from the code data and a second input from the rule data. The system processes the first input using a first embedding machine-learning model to generate a first embedding feature vector for the computer code snippet, processes the second input using a second embedding machine-learning model to generate a second embedding feature vector for the one or more energy efficiency rules, and processes (i) the first embedding feature vector and (ii) the second embedding feature vector using a code defect detection machine-learning model to generate a detection output including data representing one or more portions of the computer code snippet that negatively impact a dynamic energy efficiency of the computer code snippet upon execution by the computing device. The system performs an action based on the detection output.

In some implementations of the method, the system further determines a dynamic energy efficiency score for the computer code snippet based on the detection output, determines a comprehensive energy efficiency score based at least on (i) the predicted dynamic energy efficiency score and (ii) a static energy efficiency score computed for the computer code snippet, and outputs the comprehensive energy efficiency score. For example, the dynamic energy efficiency score can be determined based at least on (i) a number of defects characterized by the detection output and (ii) a respective priority of each of the defects characterized by the detection output. In another example, the system further obtains assessment data characterizing a user assessment on one or more of (i) software, (ii) environment, or (iii) data demographics of the computer code snippet, and determines the comprehensive energy efficiency score further based on the assessment data.

In some implementations of the method, the system determines, using the detection output, a recommendation that specifies one or more updates to the computer code snippet for improving the energy efficiency of the computer code snippet.

In some implementations of the method, the code data includes data specifying (i) prefixes and postfixes of the computer code snippet and (ii) code commit of the computer code snippet.

In some implementations of the method, each of the first embedding machine-learning model and the second embedding machine-learning model includes a respective language model. In one example, each of the first embedding machine-learning model and the second embedding machine-learning model includes a respective bidirectional Long Short-Term Memory (LSTM) network. In another example, the first embedding machine-learning model includes a first LSTM network with a higher drop rate than a second LSTM network of the second embedding machine-learning model.

In some implementations of the method, the code defect detection machine-learning model includes a discriminator network that has been trained together with a generative network configured to generate energy defects for code snippets. In some implementations, the system further performs training of the discriminator network with the generative network. To perform the training, the system obtains a plurality of training examples, each training example including (i) a respective training input including data characterizing a training code snippet and (ii) respective data characterizing commit comments for fixing energy defects of the training code snippet. The system generates processed training data by processing each training example using the embedding machine-learning models, and trains the discriminator network with the generative network as a generative adversarial networks (GANs) model. In one example, to obtain the plurality of training examples, the system searches a code repository for a set of code snippets that are similar to the input computer code snippet.

In another aspect, this specification provides a system including one or more computers and one or more storage devices storing instructions that when executed by the one or more computers cause the one or more computers to perform the method described above.

In another aspect, this specification provides one or more non-transitory computer storage media encoded with instructions that, when executed by one or more computers, cause the one or more computers to perform the method described above.

The subject matter described in this specification can be implemented in particular embodiments so as to realize one or more of the following advantages.

This specification describes techniques for evaluating and improving energy efficiency of computer codes. Compared with conventional methods, the provided techniques improve the accuracy of the energy efficiency characterization of computer code in practical situations, taking into account the dynamic interactions that can occur during code execution. Furthermore, in some implementations, the described technique provides a generative model and an optimization strategy to fix code defects in the computer code that negatively impact the energy efficiency of the computer code. That is, the provided techniques can be used to improve and optimize computer codes for energy efficiency. The improved computer code consumes less power during execution, resulting in reduced energy consumption. This is advantageous for both individual users and large-scale computing environments such as data centers. Lower energy consumption ensures a more sustainable and environmentally friendly operation.

The improved computer codes can directly contribute to reducing carbon emissions and environmental impact. By minimizing energy consumption, the provided techniques help lower the carbon footprint associated with running software applications. This aligns with global efforts to mitigate climate change, conserve natural resources, and promote sustainable computing practices.

DETAILED DESCRIPTION

This specification provides techniques for evaluating and optimizing the energy efficiency of computer code snippets.

Figure 1:
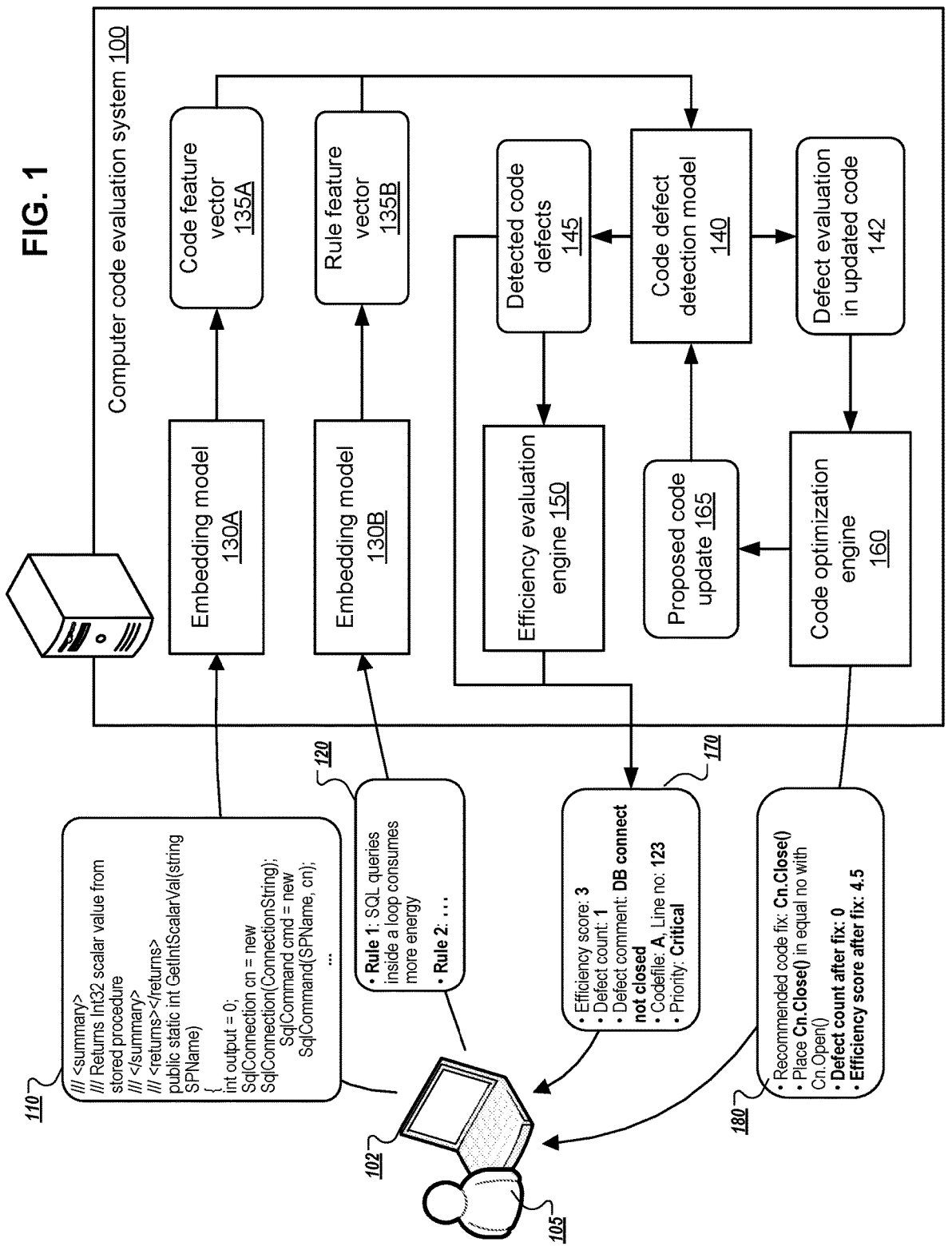
FIG. 1 shows an example computer code evaluation system for evaluating and optimizing the energy efficiency of a computer code snippet.

FIG. 1 shows an example environment in which a computer code evaluation system 100 evaluates and optimizes the energy efficiency of a computer code snippet. For the sake of clarity, the following description primarily focuses on optimizing a single computer code snippet. Nevertheless, the system 100 can perform full scale code analysis of a software system including multiple diverse code snippets. The environment includes a user device 102 operated by a user 105, e.g., a computer program developer. The system 100 can be a system implemented as computer programs on one or more computers in one or more locations, in which the systems, components, and techniques described below can be implemented. For example, the system 100 can be implemented by a computer server. The user device 102 is an electronic device that is capable of communicating with the system 100 over a network. Example user devices 110 include personal computers, server computers, mobile communication devices, e.g., smartphones and/or tablet computers, and other devices that can send and receive data over a network.

The user 105 can submit a query regarding a computer code snippet through the user device 102 to the system 100. The system 100 processes the query to generate a detection output 145 that characterizes one or more defects in the computer code snippet that negatively impact a dynamic energy efficiency of the computer code snippet upon execution by a computing device. The user device 102 receives the detection output 145 and presents the detection output to the user 105 via an interface, e.g., via a graphic user interface (GUI) of the user device 102.

More specifically, the system 100 receives, from the user device 102, code data 110 that characterizes a computer code snippet to be executed by a computing device. The system 100 also receives, from the user device 102 or another system, rule data 120 that characterizes one or more energy efficiency rules. The code data 110 can include (i) prefixes and postfixes of the computer code snippet and (ii) code commit of the computer code snippet. A prefix refers to a set of characters that are added at the beginning of names, identifiers, or labels in the code snippet. A postfix refers to a set of characters that are added at the end of names, identifiers, or labels in the code snippet. A commit refers to information for tracking changes to the code snippet over time. The rule data 120 can include data specifying expert-configured energy defect rules for computer codes. In one example, an expert-configured energy defect rule can be "database should be closed after queries." In another example, an expert-configured energy defect rule can be "SQL queries inside a loop consumes more energy than when the loop logic is coded inside the query." The expert-configured energy defect rules can be based on factors such as specific technology, specific industry, specific computing platforms, and/or specific code types. In some implementations, the rule data 120 can further include data specifying log key messages associated with the computer code snippet. In one illustrative example, a log key message can specify "DB connection not closed properly."

The system 100 includes a first embedding machine-learning model 130A, a second embedding machine-learning model 130B, and a code defect detection machine-learning model 140. The system 100 can further include a code efficiency evaluation engine 150 and a code optimization engine 160.

The first embedding machine-learning model 130A is configured to process an input generated from the code data 110 to generate a code embedding feature vector 135A. The code embedding feature vector 135A is a numerical representation (in a vector form) of the code data 110. The second embedding machine-learning model 130B is configured to process an input generated from the rule data 120 to generate a rule embedding feature vector 135B. The rule embedding feature vector 135B is a numerical representation (in a vector form) of the rule data 120.

The embedding machine-learning models in 130A and 130B can include particular neural network models combined with pre-trained models customized for different types of data vectorization using Knowledge graphs. In some implementation, the embedding models can convert code into sub-tokens using knowledge graphs which is then converted into vectors using a pre-trained machine-learning model. In other implementations, the embedding models can convert logs message into a combination of influential words using knowledge graphs which are then converted into vectors using pre-trained models.

The code embedding feature vector 135A maps the code data 110 to a vector space while capturing semantic relationships between words in the code data 110 within the context of computer code snippets. The first embedding machine-learning model 130A can have any appropriate architecture. In a particular example, the machine-learning model 130A is a language model and is configured to sequentially perform: (i) parsing the code snippet into sub-tokens, (ii) embedding the sub-tokens with a sequence of symbols, e.g. by associating the sub-tokens with an entity-relationship knowledge graph pre-trained for a particular programming language (e.g., the .NET programming language), (iii) applying a bidirectional Long Short-Term Memory (LSTM) to the symbol sequence to generate an intermediate vector, and (iv) performing average polling to the intermediate vector to generate the code embedding feature vector 135A. In particular, the bidirectional LSTM network included in the machine-learning model 130A can have a lower drop rate (e.g., ~5%).

The rule embedding feature vector 135B maps the rule data 120 to a vector space while capturing semantic relationships between words in the rule data 120 within the context of energy rules. The second embedding machine-learning model 130B can have any appropriate architecture. In a particular example, the machine-learning model 130B is a language model and is configured to sequentially perform: (i) parsing natural language of the energy efficiency rules into sub-tokens, (ii) embedding the sub-tokens with a sequence of symbols, e.g., by associating the sub-tokens with a pre-trained natural language entity-relationship knowledge graph, (iii) applying a bidirectional Long Short-Term Memory (LSTM) to the symbol sequence to generate an intermediate vector, and (i) performing average polling to the intermediate vector to generate the rule embedding feature vector 135B. In particular, the bidirectional LSTM network included in the machine-learning model 130B can have a higher drop rate (e.g., ~35%).

The code defect detection model 140 is configured to process an input generated by combining (i) the code embedding feature vector 135A and (ii) the rule embedding feature vector 135B to generate a detection output 145 that characterizes one or more defects detected in the computer code snippet that negatively impact a dynamic energy efficiency of the computer code snippet upon execution by a computing device. For example, the input can be a concatenation or a stacking of the vectors 135A and 135B. The detection output 145 can specify information including: the number of defects detected in the code snippet (e.g., "Defect count: 1"), a comment characterizing the detected defects (e.g., "DB connect not closed"), the locations of the defects in the code snippet (e.g., "Codefile: A, Line no. 123"), and a priority of a detected code defect (e.g., "critical", "normal", "low", or a numerical score specifying the priority). In general, a detected code defect with a higher priority (e.g., a "critical" priority) refers to a defect that has a more pronounced negative impact on the dynamic energy efficiency of the computer code snippet. In some implementations, the dynamic energy defects are defined using global standards such as the MITRE's Common Weakness Enumeration (CWE) and OMG's Consortium for Information & Software Quality (CISQ). The baseline for the energy defect priority can be defined based on the CISQ Green IT Measure standard. The system 100 can send the detection output 145 to the user device 102, so that the user device 102 can present the data specified by the detection output 145 to the user 105 via an interface, e.g., via a graphic user interface (GUI) of the user device 102.

In general, the code defect detection model 140 can be any appropriate type of machine-learning models. In some implementations, the code defect detection machine-learning model can include a discriminator network that is a component of a generative adversarial networks (GANs) model which further includes a generative network configured to generate energy defects for code snippets. Both the generative network and the discriminator network can include language models. For example, the generative network can use entities-relationship graphs to identify a semantic match with a code line to introduce code defects. For example, the generative network can use a machine-reasoning model implementing the natural language processing (NLP) semantic enrichment process to construct a dynamic view of current code files in nodes (as entities), edges (as relationships), and labels using a knowledge graph database. The Machine reasoning model is trained with a large corpus of data labeled as entities and relationships for code snippets and natural language text in code comments. In some implementations, given that code snippets data is considered, the machine reasoning model allows knowledge graphs to parse the code sub-tokens and natural language texts to identify individual entities and understand the relationships between different entities. The discriminator network can use entities-relationship graphs to identify a semantic match with a code line and detect code defects. A process for training the code defect detection model 140 as a component of a GANs model will be described with reference to FIG. 2.

The efficiency evaluation engine 150 is configured to determine a metric that measures a comprehensive energy efficiency of the code snippet. The comprehensive energy efficiency of the code snippet can take into account the dynamic energy efficiency, the static energy efficiency, and additional energy-related factors of the code snippet.

For the dynamic energy efficiency factor, the efficiency evaluation engine 150 computes a dynamic energy efficiency score for the code snippet based on the detection output 145. For example, the efficiency evaluation engine 150 can compute the dynamic energy efficiency score based on the number of defects detected in the code snippet and the respective priorities of the detected defects, e.g., by using a predefined rule. In one particular example, the dynamic energy efficiency score can be computed as a weighted sum of the number of each type of defect occurrences weighted by the respective priority scores.

The efficiency evaluation engine 150 can obtain a static energy efficiency score of the computer code snippet that has been computed using a conventional approach. For example, in the current state of the art, such as in the CAST tool, the static energy efficiency score is computed based on an underlying software static code scan.

The efficiency evaluation engine 150 can further obtain assessment data characterizing a user assessment (e.g., from the user 105 or a developer of the software) of factors such as software, environment, and/or data demographics of the computer code snippet, and determines the comprehensive energy efficiency metric based on (i) the dynamic energy efficiency score, (ii) the static energy efficiency score, and (iii) the assessment data. The system 100 can send the comprehensive energy efficiency metric to the user device 102, so that the user device 102 can present the comprehensive energy efficiency metric to the user 105 via an interface, e.g., via a graphic user interface (GUI) of the user device 102.

The code optimization engine 160 is configured to determine updates to the computer code snippet for improving the energy efficiency of the computer code snippet based on the detection output 145. In some implementations, the code optimization engine 160 can include a generative model configured to process the detection output 145 to generate the recommended updates. In some implementations, the code optimization engine 160 can repeatedly generate proposed code updates 165 and generate code defect evaluations 142 for the updated code using the code defect detection model 140, until a stop condition is met. The stop condition can be (i) a maximum number of repetition has been reached, or (ii) a threshold dynamic energy efficiency score has been reached for a proposed code updates. The code optimization engine 160 can select a best-performing proposed code update 165 (e.g., an update that has the best dynamic energy efficiency score) as the recommended update. The system 100 can send the recommended update 180 to the user device 120, so that the user device 102 can present the recommendation to the user 105 via an interface, e.g., via a graphic user interface (GUI) of the user device 102.

Figure 2:
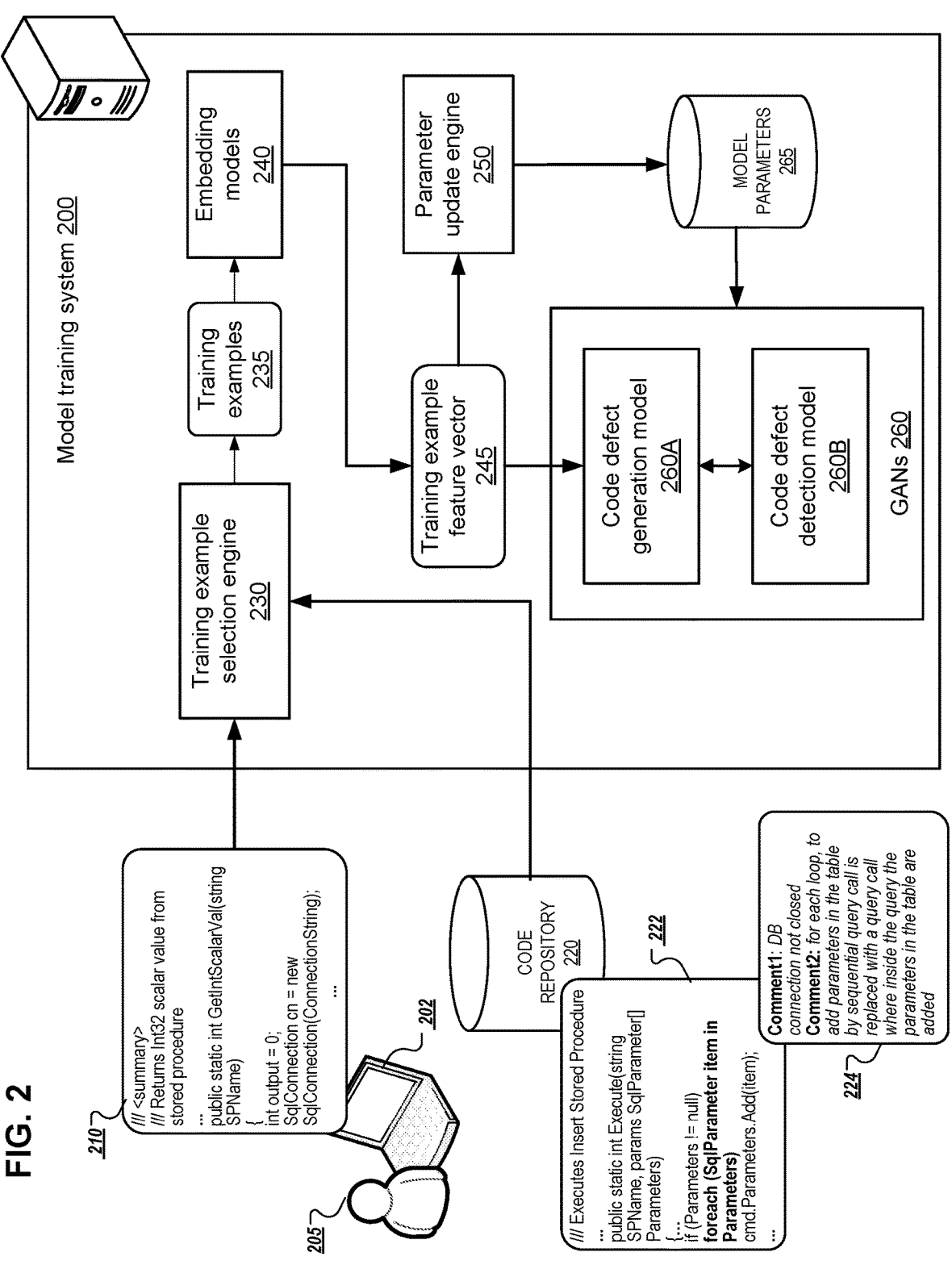
FIG. 2 shows an example model training system for training machine-learning models for evaluating the energy efficiency of a computer code snippet.

FIG. 2 shows an example environment in which a model training system 200 for performing training of a machine-learning model, e.g., the GANs model 260. The system 200 is an example of a system implemented as computer programs on one or more computers in one or more locations, in which the systems, components, and techniques described below can be implemented. The environment includes a user device 202 operated by a user 205, e.g., a computer program developer, and a code repository 220 storing code snippets 222 and comment data 224 characterizing the code snippets, such as commit comments for fixing energy defects in the code snippets.

The system 200 includes a training example selection engine 230, one or more embedding machine-learning models 240, and a parameter update engine 250 for updating the model parameters 265 of the GANs model 260 that includes a code defect generation model (generator) 260A and a code defect detection model (discriminator) 260B. The training example selection engine 230 is configured to generate training data 235, which includes a set of training examples. In some implementations, the training example selection engine 230 searches the code repository 220 for a set of code snippets that are similar to the input code snippet 210 included in the query received from the user device 202, and generates the training data 235 based on the code snippets from the code repository 220 that are similar to the input code snippet 210. In some implementations, to identify the code snippets from the code repository 220 that are similar to the input code snippet 220, the training example selection engine 230 can search the code repository 220 in an embedded feature vector space of the code snippets, where the distance between a pair of embedded feature vectors characterizes the semantic similarity between the corresponding code snippets. The training example selection engine 230 can select the code snippets from the code repository 220 having distances to the input code snippet 220 within a threshold distance in the embedded feature vector space.

The embedding models 240 are configured to process each training example 235 to generate respective embedding feature vectors 245. The code defect generation model 260A is configured to generate synthetic code defects (that would negatively impact the dynamic energy efficiencies of code executions) for code snippets, and the code defect detection model 260B is configured to generate a detection output that identifies and locates real code defects in an input code snippet. The parameter update engine 250 updates the model parameters 265 of the GANs model 260 based on the training examples 235.

In particular, the parameter update engine 250 can alternate between updating the generator parameters and the discriminator parameters in multiple iterations. For updating the parameters for the generator 260A, the parameter update engine 250 can use the generator 260A according to its current parameter values to generate a batch of synthetic code defects, calculate a generator loss by passing the generated code defects through the discriminator 260B, and computing the loss based on the feedback from the discriminator 260B (based on the current values of discriminator parameters). The parameter update engine 250 can use any appropriate backpropagation and an optimization algorithm (e.g., stochastic gradient descent) to update the generator's parameter values to minimize the generator loss.

For updating the parameters for the discriminator 260B, the parameter update engine 250 can select a batch from the training examples 235 and pass the batch of training examples through the discriminator 260B and compute the loss based on the discriminator's ability to correctly classify the code defects (e.g., whether the code defects are defects synthesized by the generator or "real" defects from the training example). The parameter update engine 250 can use any appropriate backpropagation and an optimization algorithm to update the discriminator's parameter values to minimize the discriminator loss. The parameter update engine 250 can repeat the above process for a predefined number of epochs or until the desired performance is achieved.

After training, the system 200 or another system can evaluate the performance of the trained model by using a validation dataset that includes a set of code snippet examples with corresponding code defect labels. The system can assess the performance of the trained model by comparing the model output (e.g., the defect detection result) with the labels in the validation dataset.

Figure 3:
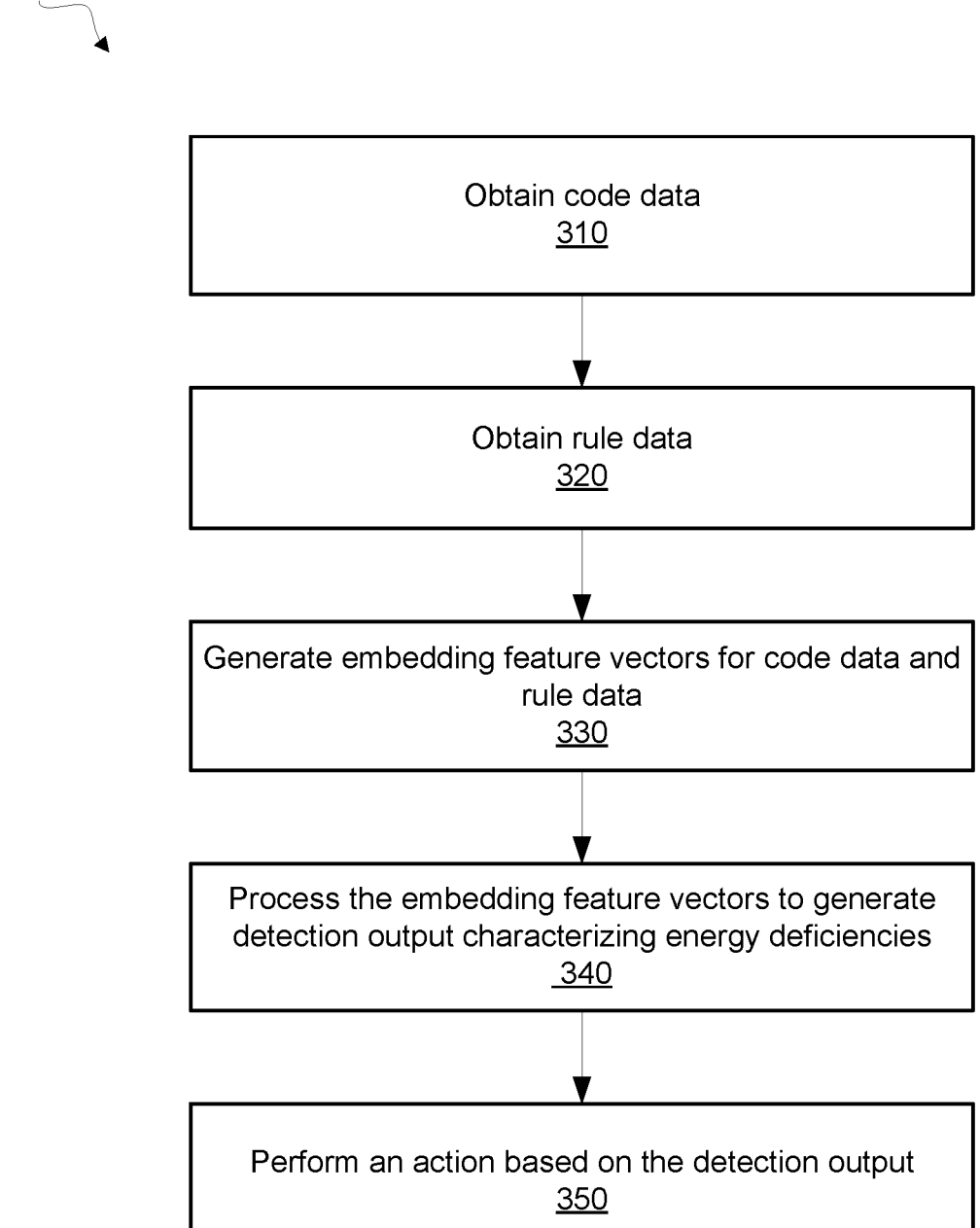
FIG. 3 is a flow diagram illustrating an example process for evaluating the energy efficiency of a computer code snippet.

FIG. 3 is a flow diagram illustrating an example process 300 for evaluating and optimizing the energy efficiency of a computer code snippet. For convenience, the process 300 will be described as being performed by a system of one or more computers located in one or more locations. For example, the system 100 described with reference to FIG. 1, and/or the system 200 described with reference to FIG. 2, appropriately programmed in accordance with this specification, can perform the process 300.

At 310, the system obtains code data characterizing a computer code snippet to be executed by a computing device. In some implementations, the code data can include data specifying (i) prefixes and postfixes of the computer code snippet and (ii) code commit of the computer code snippet.

At 320, the system obtains rule data characterizing one or more energy efficiency rules for computer code snippets.

At 330, the system generates embedding feature vectors for the code data and the rule data. In particular, the system can generate a first input from the code data, and process the first input using a first embedding machine-learning model to generate a first embedding feature vector for the computer code snippet. The system can generate a second input from the rule data, and process the second input using a second embedding machine-learning model to generate a second embedding feature vector for the one or more energy efficiency rules.

At 340, the system processes (i) the first embedding feature vector and (ii) the second embedding feature vector using a code defect detection machine-learning model to generate a detection output characterizing one or more defects in the computer code snippet that negatively impact a dynamic energy efficiency of the computer code snippet upon execution by the computing device.

In some implementations, the code defect detection machine-learning model includes a discriminator network that has been trained together with a generative network configured to generate energy defects for code snippets. To train the discriminator network with the generative network, the system can obtain a plurality of training examples. Each training example includes (i) a respective training input including data characterizing a training code snippet and (ii) respective data characterizing commit comments for fixing energy defects of the training code snippet. In some implementations, a training example can specify one or more energy defect rules, a defect description, and a priority assigned to each type of energy defect. The system can generate processed training data by processing each training example using the embedding machine-learning models, and train the discriminator network with the generative network as a generative adversarial networks (GANs) model. In some implementations, to obtain the plurality of training examples, the system can search a code repository for a set of code snippets that are similar to the input computer code snippet.

At 350, the system performs an action based on the detection output. In some implementations, the system can determine a dynamic energy efficiency score for the computer code snippet based on the detection output, and determine a comprehensive energy efficiency score based at least on (i) the predicted dynamic energy efficiency score and (ii) a static energy efficiency score computed for the computer code snippet. The system can output the comprehensive energy efficiency score, e.g., to a user device to present the comprehensive energy efficiency score to a user. In some implementations, the system can determine, using the detection output, a recommendation that specifies one or more updates to the computer code snippet for improving optimize the energy efficiency of the computer code snippet. The system can output the recommendation, e.g., to a user device to present the recommendation to a user.

Figure 4:
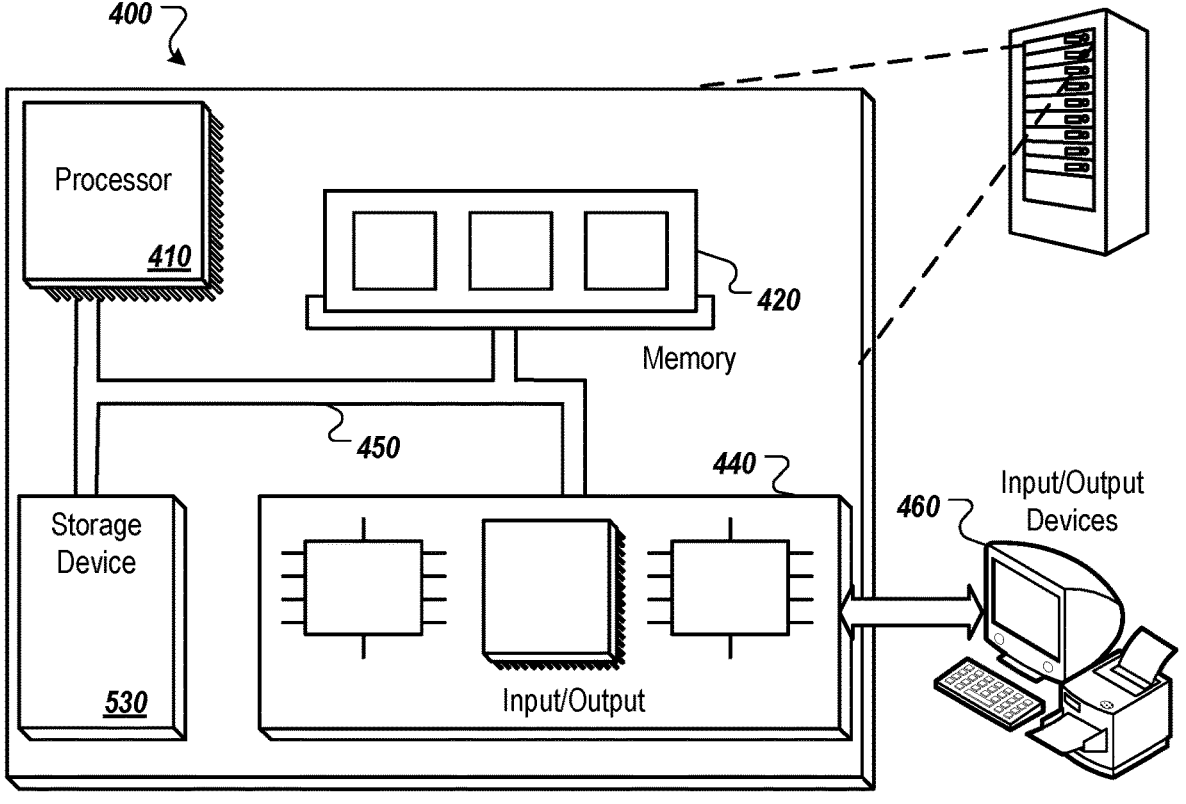
FIG. 4 shows an example computer system for performing operations for evaluating and optimizing the energy efficiency of computer code snippets. Like reference numbers and designations in the various drawings indicate like elements.

FIG. 4 shows an example computer system 400 that can be used to perform certain operations described above, for example, to perform the operations of the system 100 of FIG. 1 and the system 200 of FIG. 2. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (for example, a cloud storage device), or some other large-capacity storage device.

The input/output device 440 provides input/output operations for the system 400. In one implementation, the input/output device 440 can include one or more network interface devices, for example, an Ethernet card, a serial communication device, for example, a RS-232 port, and/or a wireless interface device. In another implementation, the input/output device can include driver devices configured to receive input data and send output data to other input/output devices, for example, keyboard, printer and display devices 460. Other implementations, however, can also be used, such as mobile computing devices, mobile communication devices, set-top box television client devices, etc.

Although an example system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, that is, one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, for example, an FPGA (field programmable gate array) or an ASIC (application-specific integrated circuit). The apparatus can optionally include, in addition to hardware, code that creates an execution environment for computer programs, for example, code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, for example, an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device, for example, a universal serial bus (USB) flash drive, to name just a few.

Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of messages to a personal device, for example, a smartphone that is running a messaging application and receiving responsive messages from the user in return.

Data processing apparatus for implementing machine learning models can also include, for example, special-purpose hardware accelerator units for processing common and compute-intensive parts of machine learning training or production, that is, inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, for example, as a data server, or that includes a middleware component, for example, an application server, or that includes a front-end component, for example, a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network (LAN) and a wide area network (WAN), for example, the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, for example, an HTML page, to a user device, for example, for purposes of displaying data to and receiving user input from a user interacting with the device, which acts as a client. Data generated at the user device, for example, a result of the user interaction, can be received at the server from the device.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
obtaining code data characterizing a computer code snippet to be executed by a computing device;
obtaining rule data characterizing one or more energy efficiency rules;
generating a first input from the code data and a second input from the rule data;
processing the first input using a first embedding machine-learning model to generate a first embedding feature vector for the computer code snippet;
processing the second input using a second embedding machine-learning model to generate a second embedding feature vector for the one or more energy efficiency rules;
processing (i) the first embedding feature vector and (ii) the second embedding feature vector using a code defect detection machine-learning model to generate a detection output comprising data representing one or more portions of the computer code snippet that negatively impact a dynamic energy efficiency of the computer code snippet upon execution by the computing device; and
performing an action based on the detection output,
wherein each of the first embedding machine-learning model and the second embedding machine-learning model comprises a respective language model, and
wherein the first embedding machine-learning model comprises a first Long Short-Term Memory (LSTM) network with a higher drop rate than a second LSTM network of the second embedding machine-learning model.

2. The method of claim 1, further comprising:
determining a dynamic energy efficiency score for the computer code snippet based on the detection output;
determining a comprehensive energy efficiency score based at least on (i) the predicted dynamic energy efficiency score and (ii) a static energy efficiency score computed for the computer code snippet; and
outputting the comprehensive energy efficiency score.

3. The method of claim 2, wherein the dynamic energy efficiency score is determined based at least on (i) a number of defects characterized by the detection output and (ii) a respective priority of each of defects characterized by the detection output.

4. The method of claim 2, wherein the method further comprises obtaining assessment data characterizing a user assessment on one or more of (i) software, (ii) environment, or (iii) data demographics of the computer code snippet, and the comprehensive energy efficiency score is determined further based on the assessment data.

5. The method of claim 1, wherein performing the action comprises:
determining, using the detection output, a recommendation that specifies one or more updates to the computer code snippet for improving the energy efficiency of the computer code snippet.

6. The method of claim 1, wherein the code data comprises data specifying (i) prefixes and postfixes of the computer code snippet and (ii) code commit of the computer code snippet.

7. The method of claim 1, wherein each of the first embedding machine-learning model and the second embedding machine-learning model comprises a respective bidirectional Long Short-Term Memory (LSTM) network.

8. The method of claim 1, wherein the code defect detection machine-learning model comprises a discriminator network that has been trained together with a generative network configured to generate energy defects for code snippets.

9. The method of claim 8, further comprising training the discriminator network with the generative network, comprising:
obtaining a plurality of training examples, each training example comprising (i) a respective training input comprising data characterizing a training code snippet and (ii) respective data characterizing commit comments for fixing energy defects of the training code snippet;
generating processed training data by processing each training example using the embedding machine-learning models; and
training the discriminator network with the generative network as a generative adversarial networks (GANs) model.

10. The method of claim 9, wherein obtaining the plurality of training examples comprises:

searching a code repository for a set of code snippets that are similar to an input computer code snippet.

11. A system comprising:
one or more memories, and
one or more computers, coupled to the one or more memories, configured to:
  obtain code data characterizing a computer code snippet to be executed by a computing device;
  obtain rule data characterizing one or more energy efficiency rules;
  generate a first input from the code data and a second input from the rule data;
  process the first input using a first embedding machine-learning model to generate a first embedding feature vector for the computer code snippet;
  process the second input using a second embedding machine-learning model to generate a second embedding feature vector for the one or more energy efficiency rules;
  process (i) the first embedding feature vector and (ii) the second embedding feature vector using a code defect detection machine-learning model to generate a detection output comprising data representing one or more portions of the computer code snippet that negatively impact a dynamic energy efficiency of the computer code snippet upon execution by the computing device; and
  perform an action based on the detection output,
  wherein each of the first embedding machine-learning model and the second embedding machine-learning model comprises a respective language model, and
  wherein the first embedding machine-learning model comprises a first Long Short-Term Memory (LSTM) network with a higher drop rate than a second LSTM network of the second embedding machine-learning model.

12. The system of claim 11, wherein the operations further comprise:
  determining a dynamic energy efficiency score for the computer code snippet based on the detection output;
  determining a comprehensive energy efficiency score based at least on (i) the dynamic energy efficiency score and (ii) a static energy efficiency score computed for the computer code snippet; and
  outputting the comprehensive energy efficiency score.

13. The system of claim 11, wherein performing the action comprises:
  determining, using the detection output, a recommendation that specifies one or more updates to the computer code snippet for improving the energy efficiency of the computer code snippet.

14. The system of claim 11, wherein the code defect detection machine-learning model comprises a discriminator network that has been trained together with a generative network configured to generate energy defects for code snippets.

15. The system of claim 14, wherein the operations further comprise training the discriminator network with the generative network, comprising:
  obtaining a plurality of training examples, each training example comprising (i) a respective training input comprising data characterizing a training code snippet and (ii) respective data characterizing commit comments for fixing energy defects of the training code snippet;
  generating processed training data by processing each training example using the embedding machine-learning models; and
  training the discriminator network with the generative network as a generative adversarial networks (GANs) model.

16. A non-transitory computer-readable storage media storing instructions that, when executed by one or more computers, cause the one or more computers to perform operations comprising:
  obtaining code data characterizing a computer code snippet to be executed by a computing device;
  obtaining rule data characterizing one or more energy efficiency rules;
  generating a first input from the code data and a second input from the rule data;
  processing the first input using a first embedding machine-learning model to generate a first embedding feature vector for the computer code snippet;
  processing the second input using a second embedding machine-learning model to generate a second embedding feature vector for the one or more energy efficiency rules;
  processing (i) the first embedding feature vector and (ii) the second embedding feature vector using a code defect detection machine-learning model to generate a detection output comprising data representing one or more portions of the computer code snippet that negatively impact a dynamic energy efficiency of the computer code snippet upon execution by the computing device; and
  performing an action based on the detection output,
  wherein each of the first embedding machine-learning model and the second embedding machine-learning model comprises a respective language model, and
  wherein the first embedding machine-learning model comprises a first Long Short-Term Memory (LSTM) network with a higher drop rate than a second LSTM network of the second embedding machine-learning model.

17. The non-transitory computer-readable storage media of claim 16, wherein the operations further comprise:
  determining a dynamic energy efficiency score for the computer code snippet based on the detection output;
  determining a comprehensive energy efficiency score based at least on (i) the dynamic energy efficiency score and (ii) a static energy efficiency score computed for the computer code snippet; and
  outputting the comprehensive energy efficiency score.

18. The non-transitory computer-readable storage media of claim 16, wherein performing the action comprises:
  determining, using the detection output, a recommendation that specifies one or more updates to the computer code snippet for improving the energy efficiency of the computer code snippet.

* * * * *